US006295363B1

(12) United States Patent
(10) Patent No.: US 6,295,363 B1
(45) Date of Patent: Sep. 25, 2001

Laak, Jr. et al.

(54) ADAPTIVE PASSIVE ACOUSTIC ATTENUATION SYSTEM

(75) Inventors: Trevor A. Laak, Jr., Madison; David W. Kapsos, Jr., McFarland, both of WI (US)

(73) Assignees: Digisonix, Inc., Middleton; Nelson Industries, Inc., Stoughton, both of WI (US)

(*) Notice: Subject to any disclaimer, the term of this patent is extended or adjusted under 35 U.S.C. 154(b) by 0 days.

(21) Appl. No.: 08/821,110

(22) Filed: Mar. 20, 1997

(51) Int. Cl.[7] .......................... H04B 15/00

(52) U.S. Cl. .......................... 381/94.1; 381/94.3; 381/71.1; 381/71.11; 381/71.8

(58) Field of Search .......................... 381/71.5, 71.13, 381/71.1, 71.8, 71.11–71.14, 94.1, 94.2–94.3; 181/206, 250, 276

(56) References Cited

U.S. PATENT DOCUMENTS

| | | | |
|---|---|---|---|
| 3,620,330 | 11/1971 | Hall . | |
| 3,642,095 | 2/1972 | Fujii . | |
| 3,712,412 | 1/1973 | Hassett et al. . | |
| 4,044,203 * | 8/1977 | Swinbanks | 381/71.5 |
| 4,665,549 | 5/1987 | Eriksson et al. . | |
| 4,677,676 | 6/1987 | Eriksson . | |
| 4,677,677 | 6/1987 | Eriksson . | |
| 5,044,464 | 9/1991 | Bremigan . | |
| 5,088,575 | 2/1992 | Eriksson . | |
| 5,119,427 | 6/1992 | Hersh et al. . | |
| 5,206,911 | 4/1993 | Eriksson . | |
| 5,216,721 | 6/1993 | Melton . | |
| 5,216,722 | 6/1993 | Popovich . | |
| 5,377,629 | 1/1995 | Brackett et al. . | |
| 5,390,255 | 2/1995 | Popovich . | |

(List continued on next page.)

FOREIGN PATENT DOCUMENTS

| | | |
|---|---|---|
| 0636207B1 | 6/1997 | (EP) . |
| WO92/15088 | 9/1992 | (WO) . |

OTHER PUBLICATIONS

"Reduction of Centrifugal Fan Noise By Use Of Resonators", W. Neise et al, Journal of Sound and Vibration, 73(2), 1980, pp. 297–308.

(List continued on next page.)

*Primary Examiner*—Duc Nguyen
(74) *Attorney, Agent, or Firm*—Andrus, Sceales, Starke & Sawall, LLP

(57) ABSTRACT

An adaptive passive acoustic attenuation system implements control techniques to facilitate practical use of adaptive passive acoustic attenuation in industrial and commercial applications. The system includes multiple banks of multiple adjustable tuners that are used to passively attenuate an acoustic disturbance (e.g. a tone) propagating through an acoustic plant. All of the tuners in one of the banks are contemporaneously adjusted during an adaptation scan while the tuners in the other banks remain stationary. The process is then carried out for the other banks of adjustable tuners. The number of adjustable tuners per bank is chosen so that adaptation scans of the tuners in the respective bank create observable changes in acoustic levels to enable adaptation. Multiple sets of multiple banks of adjustable tuners can be provided to attenuate multiple disturbances propagating through the acoustic plant. Signals from error sensors are filtered and processed to account for acoustic energy in the plane wave mode as well as higher order modes. Adaptation accuracy is improved by a double scan technique, and by accounting for time-varying acoustic disturbances. Mechanical malfunctioning of the adjustable tuners is reduced by an exercising technique, and the control model implements a lock-out scheme for mechanically malfunctioning tuners.

22 Claims, 11 Drawing Sheets

U.S. PATENT DOCUMENTS

| | | | |
|---|---|---|---|
| 5,418,873 | | 5/1995 | Eriksson . |
| 5,420,932 | | 5/1995 | Goodman . |
| 5,446,249 | | 8/1995 | Goodman et al. . |
| 5,513,266 | | 4/1996 | Zuroski . |
| 5,541,373 | | 7/1996 | Cheng . |
| 5,598,479 | * | 1/1997 | Dodt et al. .......................... 381/71.5 |
| 5,621,656 | | 4/1997 | Langley . |
| 5,628,287 | | 5/1997 | Brackett et al. . |

OTHER PUBLICATIONS

"The Use of Resonators To Silence Centrifugal Blowers", G.H. Koopman et al, Nelson Acoustics Conference, Madison, Wisconsin, Jul. 15–16, 1981.

"The Use of Resonators To Silence Centrifugal Blowers", G.H. Koopman et al, Journal of Sound and Vibration, 82(1), 1982, pp. 17–27.

"Active Noise Control To Reduce The Noise of Centrifugal Fans", G.H. Koopman et al, 1985 ASME Ind. Poll. Cont. Sym., Dallas, TX, Feb. 17–21, 1985, pp. 31–36.

"An Actively Tuned, Passive Muffler System For Engine Silencing", J.S. Lamancusa, Noise–Con 87, The Pennsylvania State University, State College, PA., Jun. 8–10, 1987, pp. 313–318.

*Acoustics of Ducts and Mufflers* With Application To Exhaust And Ventilation System Design, M.L. Munjal, John Wiley & Sons, 1987, pp. 68–71.

"Active Source Cancellation of the Blade Tone Fundamental and Harmonics in Centrifugal Fans", G.H. Koopman et al, Journal of Sound and Vibration, 126(2), 1988, pp. 209–220.

"Characteristics of Dual Mode Mufflers", E. Suyama et al, Society of Automotive Engineers, Inc., Paper No. 890612, 1989.

"Muffler System Controlling An Aperture Neck of a Resonator", T. Izumi et al, International Symposium on Active Control of Sound and Vibration, Apr. 9–11, 1991, Tokyo, Japan, pp. 261–266.

"Advanced Design of Automotive Exhaust Silencers Systems", P. Krause et al, Society of Automotive Engineers, Inc., Paper No. 922088, 1992.

"Semiactive Control of Duct Noise by a Volumne–Variable Resonator", H. Matsuhisa et al, JSME International Journal, Series III, vol. 35, No. 2, pp. 223–228

"Adaptive–Passive Noise Control", R.J. Bernhard et al, Inter–Noise, Toronto, Ontario, Canada, Jul. 20–22, 1992, pp. 427–430.

"Adaptive Tuned Vibration Absorbers: Tuning Laws, Tracking Agility, Sizing, And Physical Implementations", A.H. von Flotow et al, Noise–Con 94, Ft. Lauderdale, Florida, May 1–4, 1994, pp. 437–454.

"The State of The Art of Active–Passive Noise Control", R.J. Bernhard, Noise–Con 94, Ft. Lauderdale, FL, May 1–4, 1994, pp. 421–428.

"Adaptive–Passive Noise Control With Self–Tuning Helmholtz Resonators", J.M. DeBedout et al, Journal of Sound And Vibration, 1997, 202(1), pp. 109–123.

"Semi–Active Noise Control By A Resonator With Variable Parameters", S. Sato et al, Inter–Noise 90, pp. 1305–1308.

* cited by examiner

ADAPTIVE PASSIVE ACOUSTIC ATTENUATION SYSTEM

FIELD OF THE INVENTION

This invention relates to adaptive passive acoustic attenuation systems including adjustable tuners. In particular, the invention relates to control techniques that enable the practical implementation of adaptive passive control to industrial or other heavy duty applications.

BACKGROUND OF THE INVENTION

Adaptive passive acoustic attenuation systems involve the adjustment of adjustable tuners, such as adjustable quarter wavelength resonators or Helmholtz resonators in a sound system or adjustable vibration absorbers in a vibration system. The adaptive passive tuners are adjusted to minimize an acoustic disturbance detected by one or more error sensors within the acoustic plant. Adaptive passive systems are particularly effective for attenuating narrow band acoustic disturbances, such as tonal disturbances.

Most adaptive passive acoustic attenuation systems have been implemented in the laboratory. Implementing a practical adaptive passive acoustic attenuation system at industrial sites or in other commercial applications involves significant changes in adaptive passive control techniques to accommodate the rigorous demands of industrial and/or commercial applications. Practical applications for adaptive passive silencing techniques typically involve higher acoustic loads and less pristine environments than has previously been experienced in laboratory experiments.

The most common adaptation algorithm for adaptive passive systems involves full and/or partial parameter space scanning. In this technique, the parameter setting of the tuners is changed in increments from some starting value to some final value (e.g. increments from a fully open adjustable tuner to a fully closed adjustable tuner) and the acoustic disturbance is monitored using an error sensor at each increment. The parameter setting is determined quickly by monitoring the error signal. However, this single scan technique has some drawbacks. First, time-varying disturbances in the acoustic plant can skew the results of the parameter space scanned. Second, random background noise at or near the frequency of interest can distort the error signal. One way to reduce distortion due to random background noise is to average the error signals over time. However, such averaging creates a time lag so that the actual optimum parameter setting is slightly earlier in time than that determined by the error scan.

Most laboratory experiments involving adaptive passive systems use a single adaptive passive element (e.g. an adjustable tuner) to provide attenuation. In commercial or industrial applications, a single adjustable tuner is usually inadequate. It is normally necessary to provide multiple tuners in order to obtain sufficient attenuation levels. One adaptation technique for multiple tuner systems is to adapt a single tuner at a time, but in many applications adjusting a single tuner does not create an observable change in the sound level. If sound level changes are not observable, adaptation is impossible. Even if sound level changes are observable, single tuner adaptation techniques suffer from slow adaptation in systems using multiple tuners. On the other hand, adapting all tuners in the system synchronously (i.e. identical passive parameter value for all tuners) provides obvious changes in sound level, and maximizes adaptation speed. This technique has significant drawbacks in practical applications, however. First, the technique creates annoying disturbances during the adaptation process. The adaptation process in most adaptive passive systems scans the range of passive parameter settings to determine an optimum setting. Scanning moves the passive parameter setting away from the optimal value. Scanning all of the tuners in the system contemporaneously produces more acoustic disturbance than scanning a single tuner at a time. Thus, overall acoustic levels increase significantly while scanning. Another drawback of scanning all tuners in the system synchronously is that the system requires a higher electrical power output capacity. Each tuner requires a certain amount of electrical power to scan, and synchronous scanning of all of the tuners in the system multiplies the power capacity requirements for the system. Higher system power capacity requirements increase the cost of the system. Yet another drawback of scanning all tuners in the system synchronously is that it increases the possibility of reaching a non-optimal global solution.

While adaptive passive acoustic attenuation can be usefuil for both sound control and vibration control, one particularly useful application for adaptive passive acoustic attenuation at the present time appears to be sound attenuation of tonal disturbances propagating through a duct. At low frequencies, sound propagates through a duct as a series of plane waves. Above a critical "cut on" frequency, however, sound can propagate in the plane wave mode plus one or more higher order modes. Commercial air duct systems typically have a large enough cross-section to support sound propagation in one or more higher order modes in the frequency range of interest for attenuation. Most laboratory adaptive passive acoustic attenuation systems are implemented in a duct having a relatively small cross-section so that sound can propagate in the plane wave mode only. Thus, most laboratory systems are designed to detect acoustic energy propagation in the plane wave mode only. A practical way to detect the total combined acoustic energy propagation in the plane wave mode and in the higher order modes normally present in commercial and industrial air duct systems is desirable.

Another problem in implementing adaptive passive acoustic attenuation in commercial and industrial applications relates to the fact that the frequency of the undesirable acoustic disturbance needs to be determined in a practical manner. In most laboratory systems, the frequency of the disturbance is known or assumed. However, in commercial or industrial applications, the frequency of the undesirable disturbance can change or drift over time.

Another problem in industrial and commercial applications is that disturbance levels can change radically. Adaptation under such circumstances using current adaptation algorithms can yield questionable results.

Since industrial and commercial applications are not typically pristine like laboratory environments, it is important that the adjustable tuners remain operational in the non-pristine environment. Nonetheless, in non-pristine environments, adaptive tuners are susceptible to mechanical failure. While it is desirable to reduce mechanical failure, it is also desirable to provide adaptation techniques that account for mechanical failure.

BRIEF SUMMARY OF THE INVENTION

The invention is an adaptive passive acoustic attenuation system implementing control techniques that facilitate the practical use of adaptive passive acoustic attenuation in industrial and commercial applications, or other heavy-duty applications.

In one aspect, the invention involves the use of multiple banks of multiple adjustable tuners to improve the quality of adaptation. The multiple tuners in one of the banks contemporaneously scan the range of possible passive parameter settings to determine the optimum setting for the tuners in the bank, while adjustable tuners in the other banks remain stationary. Once the optimal setting for the first bank of adjustable tuners has been chosen, the adjustable tuners in a second bank are adjusted, while the adjustable tuners in the other banks remain stationary. This process continues for each of the banks of adjustable tuners, and can be repeated for all banks to further improve adaptation. The number of adjustable tuners in each bank is chosen so that changes in acoustical levels at the frequency of interest are observable, and adaptation of the system to optimum settings is possible. On the other hand, all of the adjustable tuners in the system are not adjusted contemporaneously, thus reducing annoying noise levels during adaptation and reducing electrical power capacity requirements, as well as improving the accuracy of adaptation.

It is preferred that each adjustable tuner be controlled by separate distinct hardware and that the members of the adjustable tuner banks be defined by software within an electronic controller for the system. If it is desired to attenuate an additional acoustic disturbance, an additional set of multiple banks of multiple tuners can be defined by the system, or added to the system to accommodate attenuation of the additional disturbance.

In another aspect, the invention accounts for the total amount of acoustic energy at the frequency of interest that is present in the acoustic plant in both the plane wave mode and in higher order modes during the adaptation process. To do this, the invention uses a plurality of error sensors at distinct locations in the acoustic plant, and filters and processes the respective error signals separately. The preferred method of filtering and processing includes a heterodyning process that frequency-shifts each error signal so that a fixed narrow bandwidth filter can be used even if the frequency of the disturbance being attenuated changes or drifts. Each of the error signals is filtered and processed independently to generate a plurality of processed error signals, each estimating the energy of the disturbance at the respective error sensor for a selected frequency bandwidth. The separate distinct processed error signals are summed together to form a group processed error signal that is used by a control model in the electronic controller for adaptation of the adjustable tuners.

When the disturbance source is time-varying, it is preferred that the system include a plurality of input sensors to monitor the disturbance source during adaptation. Input characteristic signals from the input sensors are preferably filtered and processed in the same manner as the error signals from the error sensors, and are preferably used by the control model to account for the time-varying disturbance source during adaptation.

The preferred manner of adaptation involves a full forward scan of the passive parameter settings for the tuning element of the adjustable tuner, and also a full reverse scan. During the forward scan, the group processed error signal, possibly adjusted for a time-varying disturbance source, is tabulated with respect to the full range of passive parameter settings for the tuning element, and a minimum value for the forward scan is determined. However, since it is desirable to time average the processed error signals to eliminate the effects of random noise, the forward scan lags, and the minimum value for the forward scan lags the actual optimal setting for the tuning element. Thus, in accordance with a preferred embodiment of the invention, a reverse scan is performed to determine a minimum value for the reverse scan, which also lags the optimal setting but in the other direction. The optimal passive parameter setting is then determined by averaging the minimum processed error value for the forward scan and the minimum processed error value for the reverse scan.

In another aspect, the invention involves implementation of an exercising technique that is used to periodically exercise the tuning element for the adjustable tuner even when it is not necessary to adapt the system. Periodic exercising cleans the adjustable tuner, and reduces the likelihood of premature mechanical failure. The invention also implements the use of limit switches to detect when a mechanical malfunction has occurred either during an adaptation scan or while exercising the tuning element of the adjustable tuner. If the system detects that an adjustable tuner is malfunctioning, the system control model no longer adjusts the failed adjustable tuner and considers the adjustable tuner to be eliminated from the system. Therefore, further damage to the malfunctioning adjustable tuner is obviated.

The invention thus provides an adaptive passive acoustic attenuation system that can be effectively implemented in industrial and commercial applications.

Other advantages and features of the invention may be apparent to those skilled in the art upon inspecting the drawings and the following description thereof.

DETAILED DESCRIPTION OF THE DRAWINGS

Figure 1:
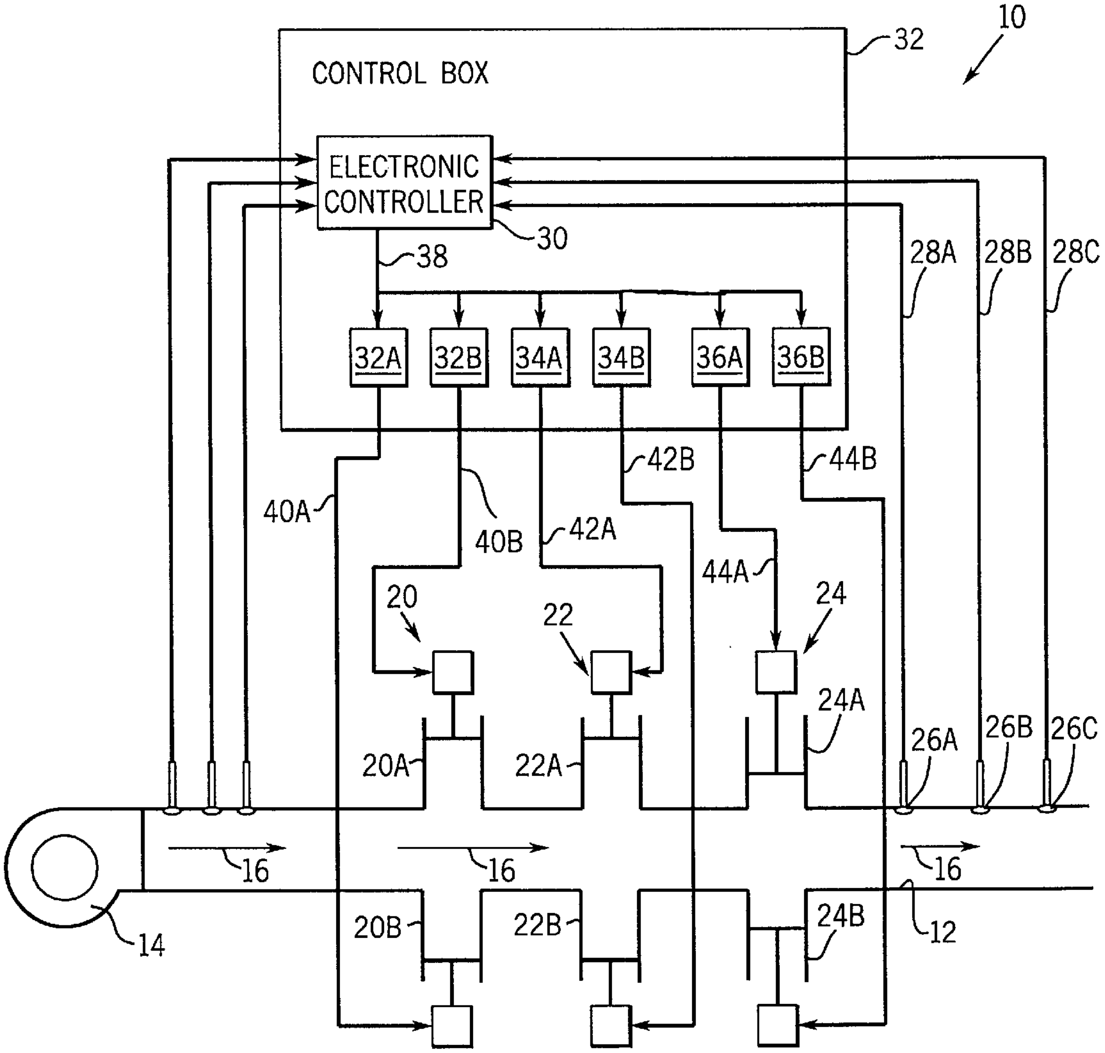
FIG. 1 is a schematic drawing illustrating an adaptive passive acoustic attenuation system in accordance with the invention.

FIG. 1 illustrates an adaptive passive attenuation system 10 in accordance with the preferred embodiment of the invention that attenuates an acoustic disturbance, such as a tone, propagating through an acoustic plant 12. In the embodiment of the invention shown in the drawings, the system 10 attenuates a selected tonal disturbance propagating through the acoustic plant 12, however, the invention is not limited to the attenuation of tonal disturbances. Rather, the invention can be used for narrow band attenuation and even for broad band attenuation if several narrow band systems are combined together.

The acoustic plant 12 shown in FIG. 1 is a duct, e.g., a cylindrical duct common in heavy-duty industrial applications or a rectangular duct common in commercial HVAC applications. The duct 12 receives acoustic input from a disturbance source 14 such as a fan. The arrows designated by reference numeral 16 represent the acoustic disturbance propagating from the fan 14 through the duct 12.

The system 10 includes a plurality of adjustable tuners 20A, 20B, 22A, 22B, 24A, 24B that communicate acoustically with the acoustic plant 12 (i.e. duct 12). The adjustable tuners 20A, 20B, 22A, 22B, 24A, 24B each have passive acoustical characteristics that are adjustable in accordance with passive parameter settings. The adjustable tuners 20A, 20B, 22A, 22B, 24A, 24B are preferably quarter wavelength resonators each having a selectively positionable plunger. Repositioning the plungers adjusts the length of the respective resonator 20A, 20B, 22A, 22B, 24A, 24B, and thus adjusts the frequency at which the adjustable tuner most effectively attenuates. It should be understood, however, that the invention is not limited to the use of quarter wavelength resonators, but other types of adjustable passive tuners such as Helmholtz resonators or the like can be used in accordance with the invention. Copending patent application entitled "Tunable Acoustic System" Ser. No. 08/780,480, now U.S. Pat. No. 5,930,371, by C. Raymond Cheng, Jason D. McIntosh, Michael T. Zurowski and Larry J. Eriksson, incorporated herein by reference, discloses certain alternative configurations for adjustable or tunable resonators that can be used in carrying out the invention.

The system 10 includes a plurality of error sensors 26A, 26B, 26C that are located to sense the acoustic disturbance 16 in the acoustic plant 12 downstream of the adjustable tuners 20A, 20B, 22A, 22B, 24A, 24B from the disturbance source 14. In a sound attenuation system, the error sensors 26A, 26B, 26C are preferably microphones. In a vibration attenuation system, the error sensors 26A, 26B, 26C are preferably accelerometers. The purpose of the system 10 is to adjust the adjustable tuners 20A, 20B, 22A, 22B, 24A, 24B to passively attenuate a selected tone propagating through the acoustic plant 12 from the disturbance source 14 so that the energy of the tonal disturbance at the error microphones 26A, 26B, 26C is minimized. Each error sensor 26A, 26B, 26C senses the acoustic disturbance within the duct 12 at a distinct physical location. In response to the sensed acoustic disturbance 16, each error sensor 26A, 26B, 26C generates an analog error signal that is transmitted via lines 28A, 28B, 28C to an electronic controller 30. While FIG. 1 illustrates the use of three error sensors 26A, 26B, 26C, in many applications it may be desirable to use more or less error sensors.

The electronic controller 30 is located within a control box 32 that also contains a series of dedicated tuner control boards 32A, 32B, 34A, 34B, 36A, 36B, each corresponding to a respective adjustable tuner 20A, 20B, 22A, 22B, 24A, 24B. The electronic controller 30 outputs a correction signal in line 38 that is transmitted to the tuner control boards 32A, 32B, 34A, 34B, 36A, 36B. A dedicated control line 40A, 40B, 42A, 42B, 44A, 44B connects each tuner control board 32A, 32B, 34A, 34B, 36A, 36B to a respective adjustable tuner 20A, 20B, 22A, 22B, 24A, 24B. Each tuner control board 32A, 32B, 34A, 34B, 36A, 36B controls the adjustment of the respective adjustable tuner 20A, 20B, 22A, 22B, 24A, 24B by transmitting a control signal through the respective dedicated line 40A, 40B, 42A, 42B, 44A, 44B. The control signals transmitted through lines 40A, 40B, 42A, 42B, 44A, 44B are generated in response to the correction signal from the electronic controller 30 transmitted to the tuner control boards 32A, 32B, 34A, 34B, 36A, 36B via line 38.

Figure 2:
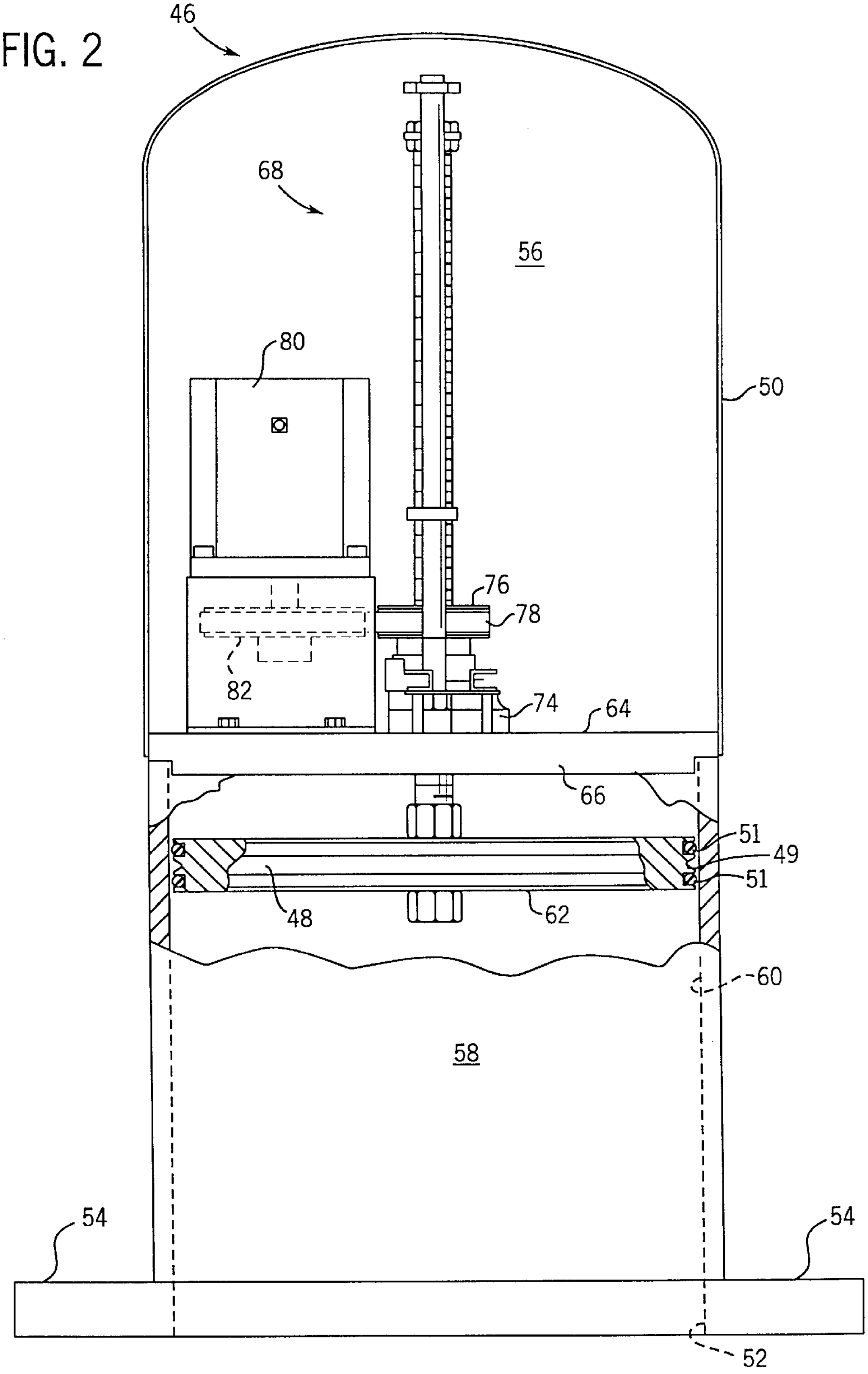
FIG. 2 is a side elevational view of the mechanical components of a quarter wavelength resonator that is used in the preferred embodiment of the invention.
Figure 3:
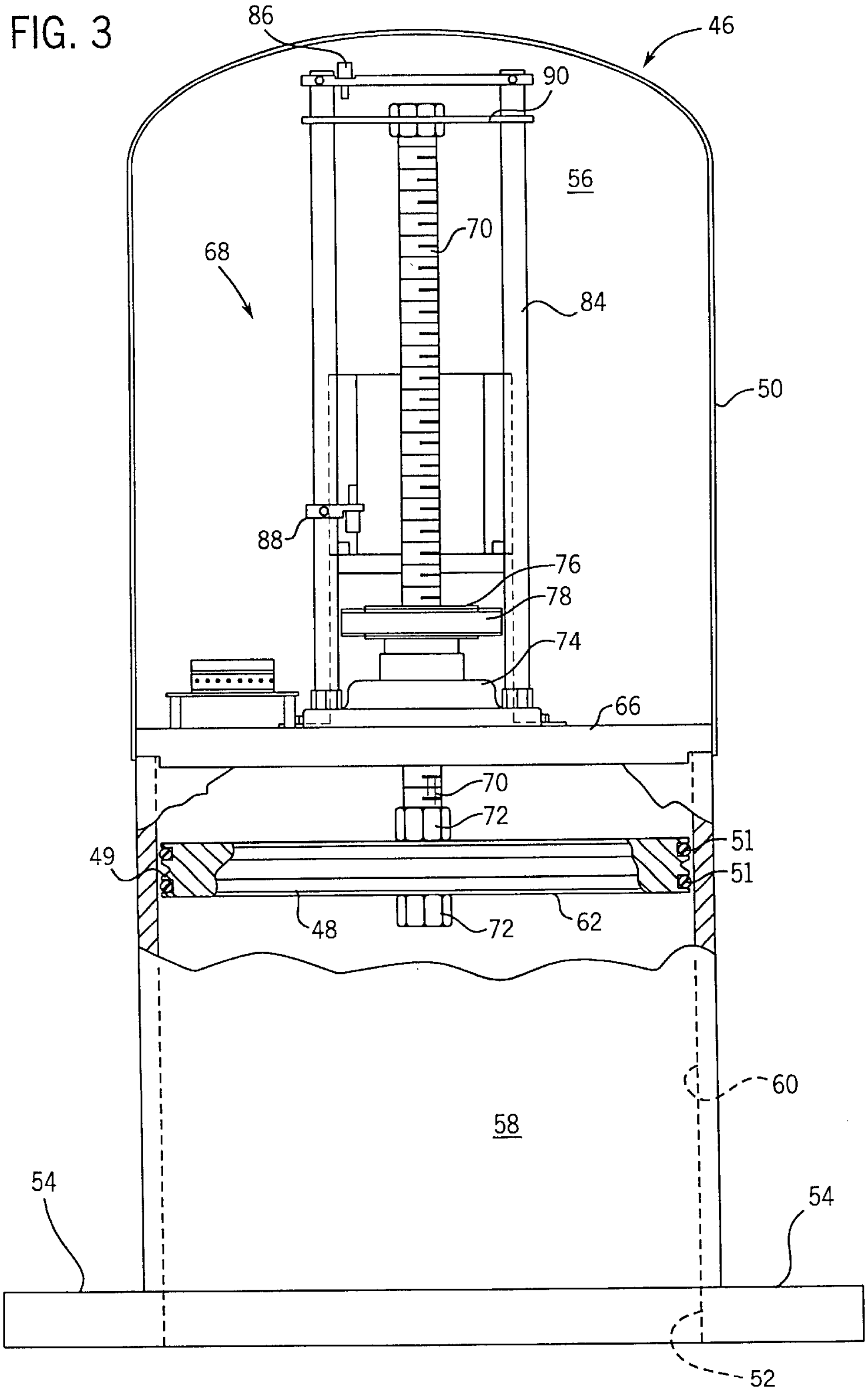
FIG. 3 is a view of the quarter wavelength resonator shown in FIG. 2 rotated 90°.

It is preferred that each of the adjustable tuners 20A, 20B, 22A, 22B, 24A, 24B be identical to one another in size and geometry, although this is not necessary to carry out the invention. FIGS. 2 and 3 illustrate the preferred adjustable tuner 20, 22, 24 which is a quarter wavelength resonator 46 having a selectively positionable plunger 48. The preferred quarter wavelength resonator 46 has a generally cylindrical housing 50. The housing 50 has an open end 52 that communicates with the acoustic plant 12 when the resonator 46 is mounted on the duct 12. A circumferential mounting flange 54 is provided around the open end 52 of the resonator housing 50 so that the resonator can be easily mounted to the duct 12. The resonator housing 50 includes a mechanical chamber 56 and an acoustical quarter wavelength chamber 58. The acoustical chamber 58 is defined by an inner surface 60 of the resonator housing 50, the inner surface 62 of the selectively positionable plunger 48 and the opening 52 that allows the acoustical chamber 58 to communicate with the acoustic plant 12 when the resonator 46 is mounted to the duct 12. The circumferential edge 49 of the plunger 48 includes two seals 51 that seal between the circumferential edge 49 of the plunger 48 and the inner surface 60 of the cylindrical wall of the resonator 50. The mechanical chamber 56 is defined by the inside surface of the resonator housing 50 and a top surface 64 of a mounting plate 66 that spans across the inside surface of the resonator 50 cylindrical wall. The mounting plate 66 supports a lead screw drive system 68 that is used to move the plunger 48 to adjust the dimensions of the acoustical quarter wavelength chamber 58. The lead screw drive system 68 includes a lead screw 70 that passes through a center opening (not shown) in the mounting plate 66 and is attached to the movable plunger 48 using bolts 72. A bearing 74 supports the lead screw 70 as the lead screw 70 passes through the mounting plate 66. A lead screw drive pulley 76 having a threaded annular opening is rotated by belt 78 to drive the lead screw 70 and reposition the plunger 48. A stepper motor 80 located within the mechanical chamber 56 drives a pulley mechanism 82 that is connected to pulley drive belt 78. Thus, the stepper motor 80 can be controlled to drive the pulley drive belt 78, and move the lead screw 70 and the movable plunger 48 in the acoustical quarter wavelength chamber 58 accordingly. In this manner, the position of the plunger 48 can be selectively positioned so that the distance of the plunger 48 from the opening 52 matches one-quarter of a wavelength of the tone desired to be attenuated.

The lead screw drive mechanism also includes a frame 84 that extends over the lead screw 70. An upper limit switch 86 is mounted to a top portion of the frame 84 and a lower limit switch 88 is mounted to a lower portion of the frame 84. A switch trigger plate 90 is mounted to a top portion of the lead screw 70. When the adjustable quarter wavelength resonator 46 is in a fully open position, the switch trigger plate 90 attached to the lead screw 70 triggers the upper limit switch 86. When the adjustable quarter wavelength resonator 46 is in a fully closed position, the switch trigger plate 90 triggers the lower limit switch 88.

Figure 4:
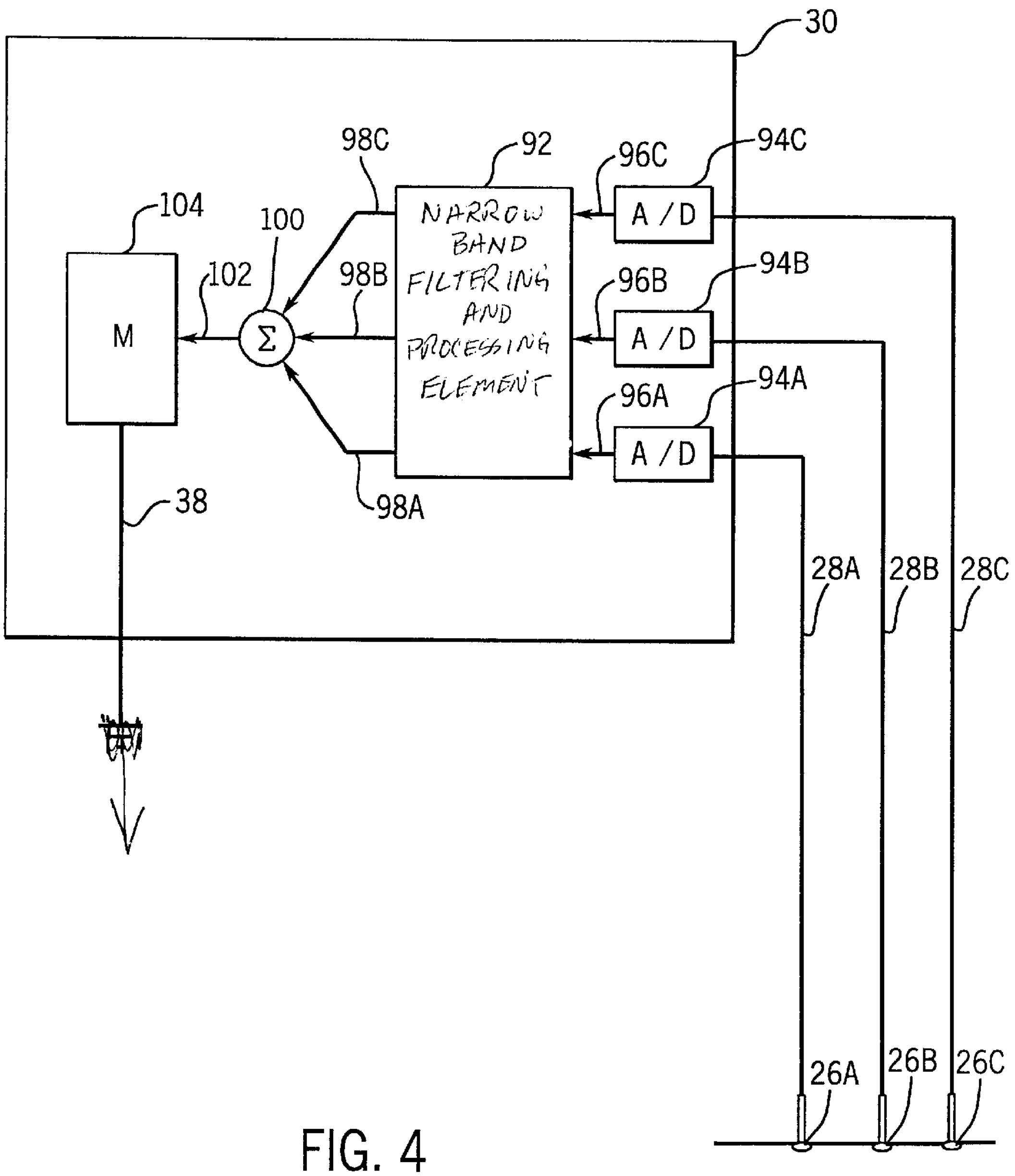
FIG. 4 is a schematic drawing illustrating a control scheme implemented in an electronic controller in accordance with the invention.

Referring now to FIG. 4, the electronic controller 30 includes a narrow bandwidth filter and a processing element 92 that filters and processes the error signals from the error sensors 26A, 26B, 26C to create processed error signals corresponding to the tone of interest in the acoustic disturbance. In particular, the analog error signals in lines 28A, 28B and 28C from the error sensors 26A, 26B, 26C are transmitted to a respective analog to digital converter 94A, 94B, 94C. The A/ID converters 94A, 94B, 94C each output a digital error signal in lines 96A, 96B, 96C, respectively. The digital error signals in lines 96A, 96B, 96C separately input the narrow bandwidth filtering and processing element 92. The narrow bandwidth filtering and processing element 92 outputs processed error signals represented by reference numbers 98A, 98B, 98C, which preferably represent the average energy of the acoustic disturbance sensed by the respective error sensor 26A, 26B, 26C. The separate processed error signals in lines 98A, 98B, 98C are summed at summer 100 which outputs a group processed error signal in line 102. The group processed error signal in line 102 is used by a control model M, designated as block 104, to adjust the setting of the adjustable tuners 20A, 20B, 22A, 22B, 24A, 24B. The control model M, block 104, outputs the correction signals in line 38.

It is preferred that the control model M, block 104, implement a full or partial parameter space scanning technique to determine the value of the correction signal 38 and the optimal passive parameter setting for the adjustable tuners 20A, 20B, 22A, 22B, 24A, 24B. Many aspects of this invention can be carried out even though the control model M, block 104, does not implement a full or partial parameter space scanning technique. For instance, other adaptation techniques, such as gradient descent or open loop control, can be implemented by the control model M, block 104. In the full or partial parameter space scanning technique, passive parameter settings for each of the adjustable tuners 20A, 20B, 22A, 22B, 24A, 24B are changed in increments from a scan start setting to a scan end setting, and the group processed error signal in line 102 is monitored along the scan. In general, the optimal value for the passive parameter setting for each of the tuning elements 20A, 20B, 22A, 22B, 24A, 24B is determined to be the setting at which the group processed error signal is minimized. By basing the determination of the optimal settings on the group processed error signal 102 instead of a single processed error signal such as 98A, 98B, or 98C, it is unlikely that acoustic energy in a higher order mode will be neglected.

For successful application of adaptive passive acoustic attenuation in most industrial and commercial sites, using a single error microphone is not sufficient due to the relatively large duct size because acoustic energy propagation in the higher order modes is probable. If acoustic energy propagation in higher order modes is not likely to be present, the system 10 can use a single error microphone effectively. However, in most industrial and commercial applications, multiple error sensors 26A, 26B, 26C are desirable. Summing multiple microphones in a single plane in the time domain results in a signal representing nodal acoustic energy propagation in the plane wave mode only, but it is also desirable to attenuate acoustic energy propagation in the higher order modes. Therefore, to approximate the overall acoustic energy propagation at the desired frequency through the duct 12, the acoustic energy at each error sensor 26A, 26B, 26C is determined at the frequency of interest $\omega_1$ to generate a processed error signal, and the acoustic energy at each error sensor are summed together to provide an overall acoustic energy estimate at the frequency of interest $\omega_1$ (i.e. a group processed error signal).

Figure 5:
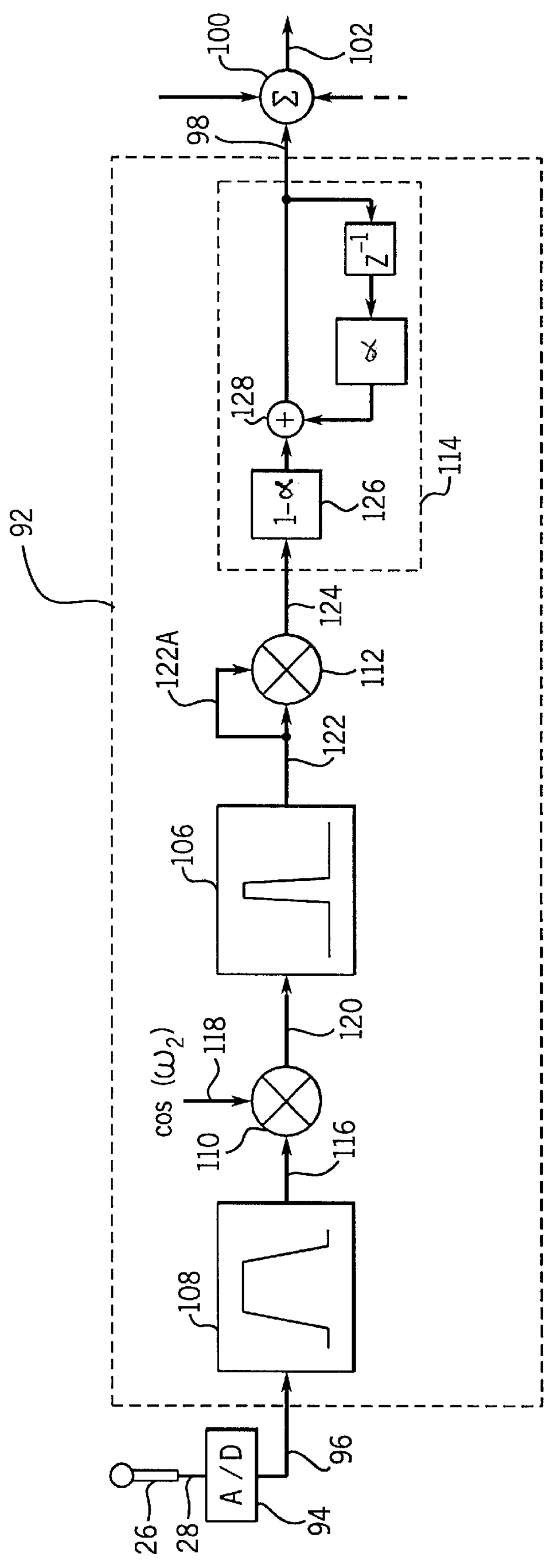
FIG. 5 is a schematic drawing illustrating a narrow band filtering and processing element using a heterodyning technique that is implemented in accordance with a preferred embodiment of the invention.

FIG. 5 illustrates the preferred narrow band filtering and processing element 92. The preferred narrow band filtering and processing element 92 implements a heterodyning process that uses a fixed narrow bandpass filter 106. As shown in FIG. 5, the preferred narrow band filter and processing element 92 also includes a broad bandpass filter 108, a frequency-shifting multiplier 110, an instantaneous power multiplier 112, and a time averager 114. The digital error signal in line 96 preferably inputs the broad bandwidth filter 108. The broad bandwidth filter 108 should have a bandwidth of 20–50 Hz with a center frequency that roughly matches the disturbance frequency. The purpose of the broad bandwidth filter 108 is to pre-filter the digital error signal before the heterodyning process, which minimizes the risk of having noise at the sum frequency appear at the difference frequency of interest (or vice-versa) during the heterodyning process.

The broad bandwidth filter 108 outputs a pre-filtered digital error signal in line 116. The pre-filtered digital error signal in line 116 inputs the frequency-shifting multiplier 110. A heterodyning tone signal in line 118 represented as $\cos(\omega_2 k)$ also inputs the frequency-shifting multiplier 110. The frequency-shifting multiplier 110 outputs a frequency-shifted error signal as illustrated by line 120. The frequency $\omega_2$ of the heterodyning signal $\cos(\omega_2 k)$ is determined by comparing the frequency $\omega_1$ of the tone that is desired to be attenuated to the center frequency $\omega_3$ of the fixed narrow bandpass filter 106. For instance, the pre-filtered error signal illustrated by line 116 has an amplitude $A_1$ and a frequency $\omega_1$, so that the tone can be represented as $A_1 \cos(\omega_1 k)$. The frequency-shifted error signal illustrated in line 120 from the frequency-shifting multiplier 110 is given by the following expression:

$$A\cos(\omega_1 k)\cos(\omega_2 k)=\tfrac{1}{2}A[\cos((\omega_1+\omega_2)k)+\cos((\omega_1-\omega_2)k)] \quad \text{(Eq. 1)}$$

Thus, the heterodyning frequency $\omega_2$ can be determined so that either adding the heterodyning frequency $\omega_2$ to the frequency of interest $\omega_1$ or subtracting the heterodyning frequency $\omega_2$ from the frequency of interest $\omega_1$ corresponds to the center frequency $\omega_3$ of the fixed narrow bandpass filter 106. As an example, if the fixed narrow bandpass filter 106 has a center frequency $\omega_3$ of 100 Hz and the disturbance frequency $\omega_1$ is 238 Hz, selecting a heterodyning frequency $\omega_2$ of 138 Hz or 338 Hz shifts the error signal as illustrated in line 120 to 100 Hz for filtering through the fixed narrow bandpass filter 106.

The disturbance frequency $\omega_1$ is normally time-varying, and should be monitored to properly select a heterodyning frequency $\omega_2$. The disturbance frequency $\omega_1$ can be sensed using a tachometer-type sensor on the disturbance source 14. Alternatively, the disturbance frequency $\omega_1$ can be monitored with an input sensor near the disturbance source 14 and an accompanying phase-lock loop circuit, or in some applications it may even be possible to use one of the error sensors 26 with an accompanying phase-lock loop circuit.

The primary advantage of using a fixed narrow bandwidth filter 106 and a heterodyning technique to shift the frequency of the error signal is that this approach requires the design and implementation of only a single, fixed narrow bandwidth filter 106, even though the disturbance frequency of interest $\omega_1$ may change or drift over time. The single, fixed narrow bandpass filter 106 can be designed using commercial filter design packages, which facilitates the development of an accurate filter 106. Once the filter 106 is designed, the filter coefficients can be downloaded onto the electronic controller 30. Alternatively, the filter coefficients can even be included as compile-time constants. Thus, during operation, only the heterodyning frequency $\omega_2$ needs to be calculated. This is significantly more practical than generating and implementing distinct narrow bandpass filters having a center frequency corresponding to the disturbance frequency (o, while the system 10 is on-line.

The fixed narrow bandwidth filter 106 outputs a filtered disturbance signal fds[k] as illustrated by line 122. The filtered disturbance signal fds[k] is squared as illustrated by lines 122 and 122A and squaring multiplier 112. Squaring multiplier 112 outputs an instantaneous power signal, line 124. The instantaneous power signal 124 is preferably time averaged, block 114. Block 114 illustrates that the instantaneous power signal 124 is weighted by a factor of $1-\alpha$ where $0 \leqq \alpha \leqq 1$ represents a time constant. The summer 128 indicates that the time weighted instantaneous power signal is summed with a weighted error energy estimate for the previous sampling period to generate an error energy estimate or processed error signal in line 98. The processed error signal 98 is specific to each filtered disturbance signal fds[k]. The processed error signal 98 is thus an energy estimate for the error signal from the respective error sensor 26A, 26B, 26C given by the following expression:

$$\text{Energy Est.}[k]=(\alpha)(\text{Energy Est.}[k-1])+(fd[k])^2(1-\alpha) \qquad \text{(Eq. 2)}$$

where Energy Est. [k] is the value of the processed error signal in line 98 at time k, $\alpha$ is a time averaging weight factor $0 \leqq \alpha \leqq 1$, and fds[k] represents the filtered disturbance signal in line 122 output from the fixed narrow bandpass filter 106. The time constant uo should be chosen so that the time averager 114 is long enough to smooth instantaneous power at the center frequency of the fixed narrow bandpass filter 106, but should be short enough so that changes in the actual energy can be observed quickly.

As shown in FIG. 5, the error signals from each of the plurality of error sensors 26A, 26B, 26C are separately filtered through the narrow band filtering and processing element 92 to generate the processed error signals in lines 98A, 98B, 98C, FIGS. 4, 5. FIGS. 4 and 5 show that the separate processed error signals 98A, 98B, 98C are then summed together by summer 100 to generate the group processed error signal 102.

If multiple disturbance frequencies co, are being attenuated by the system 10, the entire process illustrated in FIG. 5 must be carried out for each frequency $\omega_1$ of interest. In such a system, it is preferred that all of the frequencies of interest $\omega_1$ be shifted independently such that the same narrow bandwidth filter 106 coefficients can be used for each disturbance frequency $\omega_1$ of interest.

Referring again to FIG. 1, in most industrial and commercial applications, more than one adjustable tuner 20A, 20B, 22A, 22B, 24A, 24B must be adjusted to create observable changes in the acoustical disturbance 16 that can be detected by the error sensors 26A, 26B, 26C. In accordance with the invention, the system 10 thus provides multiple banks 20, 22, 24 of multiple adjustable tuners 20A and 20B, 22A and 22B, and 24A and 24B, respectively. Each of the adjustable tuners in the respective bank 20, 22, 24 are adjusted contemporaneously to vary the acoustic disturbance 16 sensed by the error sensors 26, 26B, 26C while the adjustable tuners in the other banks remain stationary. In this manner, a first bank 20 of adjustable tuners such as 20A, 20B can accomplish a full or partial scan of the passive parameter settings to create observable acoustical changes, thus allowing an optimal setting for the adjustable tuners 20A, 20B in the first bank 20 to be determined. After determining an optimal setting for the tuners 20A, 20B in the first bank 20, the second bank 22 of tuners 22A, 22B is adjusted in accordance with a full or partial scan of the passive parameter settings, while the adjustable tuners in the other banks remain stationary, to determine the optimal setting for the adjustable tuners 22A, 22B in the second bank 22B of tuners. Likewise, the tuners in each remaining bank are adjusted to accomplish a full or partial scan while the tuners not in the respective remaining bank remain stationary. This process can be repeated as necessary to improve attenuation.

While FIG. 1 illustrates three banks 20, 22, 24 each having two adjustable tuners 20A and 20B, 22A and 22B, and 24A and 24B, the invention is not limited to this specific configuration. One or more additional banks of adjustable tuners can be added to the system. Further, it is not required that the same number of tuners be present in each bank of tuners. For instance, in an application requiring ten tuners, it may be desirable for one bank of tuners to have four adjustable tuners while another bank of tuners has six adjustable tuners.

To promote flexibility of the system 10 among different applications having various acoustical requirements, it is preferred that the assignment of adjustable tuners 20A, 20B, 22A, 22B, 24A, 24B to the respective bank 20, 22, 24 be implemented by software within the electronic controller 30. Thus, the correction signal 38 from the electronic controller 30 to the tuner control boards 32A, 32B, 34A, 34B, 36A, 36B controls the sequencing, scanning, and optimal setting for each of the tuner control boards 32A, 32B, 34A, 34B, 36A, 36B in accordance with a software-selected bank configuration. The bank configuration is preferably selected by a system 10 operator or programmer. In some applications, it may be desirable to choose the bank configuration using artificial intelligence implemented within the electronic controller 30.

Using multiple banks 20, 22, 24 of multiple tuners 20A and 20B, 22A and 22B, 24A and 24B, the system 10 achieves reasonably quick adaptation without sacrificing adaptation accuracy as long as the bank configuration is selected properly. In addition, the required electrical power output capacity of the system 10 necessary to move the adjustable tuners is reduced dramatically when compared to a system that scans all of the adjustable tuners contemporaneously. Further, adaptation can be accomplished without creating annoying disturbances during adaptation.

Referring again to FIGS. 2 and 3, mechanical failure of one or more of the adjustable tuners can adversely affect system performance 10. To reduce the likelihood of mechanical failure, the adjustable tuning element (e.g., the selectively positionable plunger 48) should be exercised through a full range of settings on a periodic basis. For instance, with respect to the quarter wavelength resonator 46 shown in FIGS. 2 and 3, exercising the resonator 46 so that the plunger 48 moves from a fully closed position to a fully open position on a regular basis ensures that dirt/waste/particle build-up on the cylinder wall 60 of the acoustical quarter wavelength chamber 58 is not excessive. Eliminating excessive build-up reduces the likelihood of increased mechanical resistance due to rust or other corrosion. The preferred manner of cleaning or exercising consists of moving the plunger 48 to the fully closed position, moving the plunger 48 to the fully open position, and returning the plunger 48 to the optimal setting. An alternative cleaning/exercising procedure consists of moving the plunger 48 from the optimal setting to the fully closed position, and returning the plunger 48 to the optimal setting. Such a cleaning/exercising procedure should be carried out on a regular basis, and is especially important if regular adaptation is not possible. For instance, it may be desirable to clean or exercise the resonator 48 on a regular basis, but adapt only in cases when there is significant performance loss.

Still referring to FIGS. 2 and 3, the scan start limit switch 86 and the scan end limit switch 88 are provided so that the electronic controller 30 can determine whether or not each resonator 46 is fully functional. If the electronic controller 30 detects a mechanical failure, it is preferred that the resonator 46 with the mechanical failure be dropped from the adaptive control system 10 (i.e. the electronic controller 30 no longer generates a correction signal 38 to control the malfunctioning tuner control board, for instance 36B, to drive the respective adjustable tuner 24B).

It is convenient to test the respective tuner 46 when the tuner 46 is exercised as discussed above. When the plunger 48 is moved to the fully closed position, the lead screw switch trigger plate 90 actuates the closed position limit switch 88. As the stepper motor 80 drives the lead screw 70 to move the plunger 48 from the fully closed position to the fully open position, memorization of the stepper motor steps provides an estimate of the current position of the plunger 48. Under normal operating conditions, when the plunger 48 is moved to the fully open position, the lead screw switch trigger plate 90 actuates the open position limit switch 86. If the plunger 48 binds against the inner wall 60 of the resonator 46, the binding may cause the plunger 48 to lock-up, and the plunger 48 may not physically reach the fully closed position. If the plunger 98 does not reach the fully closed position, the lead screw switch trigger plate 90 will not actuate the closed position limit switch 88. If either of the open position limit switch 86 or the closed position limit switch 88 are not triggered, or if either of the switches 86 or 88 fails, the electronic controller 30 determines that the respective resonator is not fully functional, and terminates adaptation of the failed resonator 46.

Figure 6A:
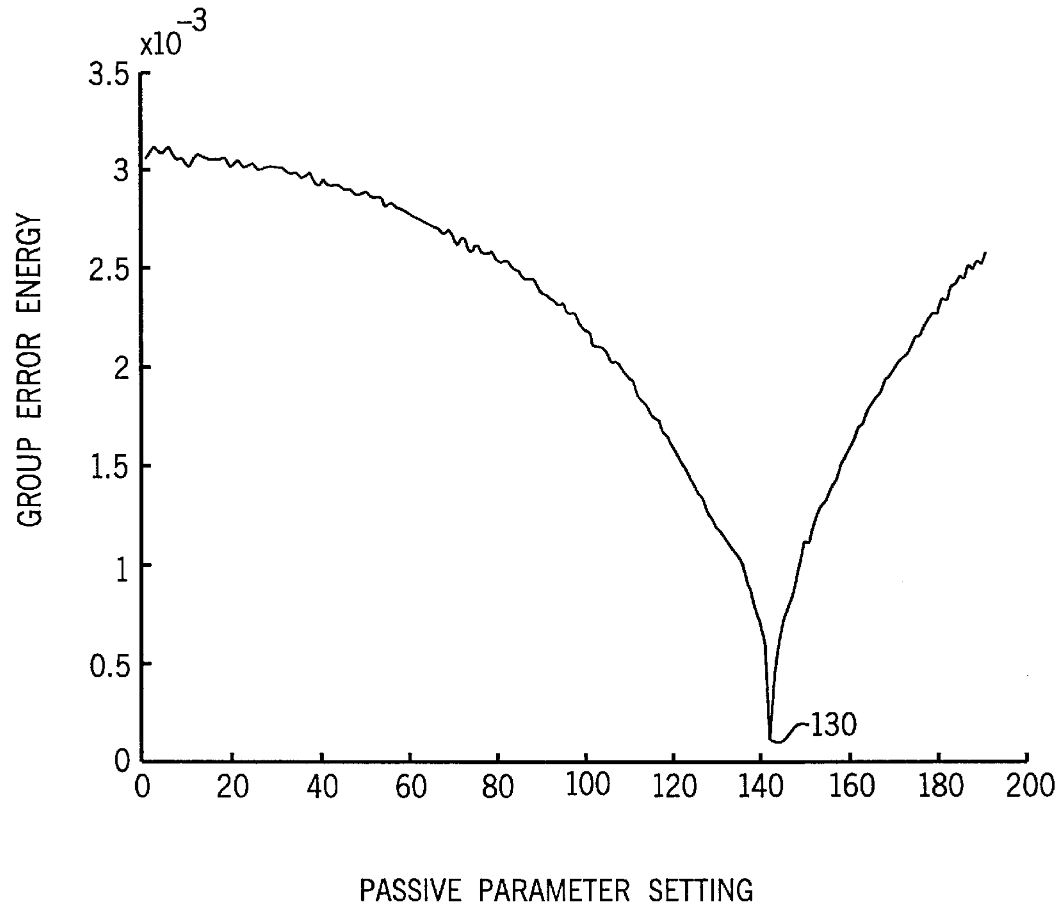
FIGS. 6A–6C are plots illustrating a double scan adaptation technique used in accordance with the preferred embodiment of the invention.
Figure 6B:
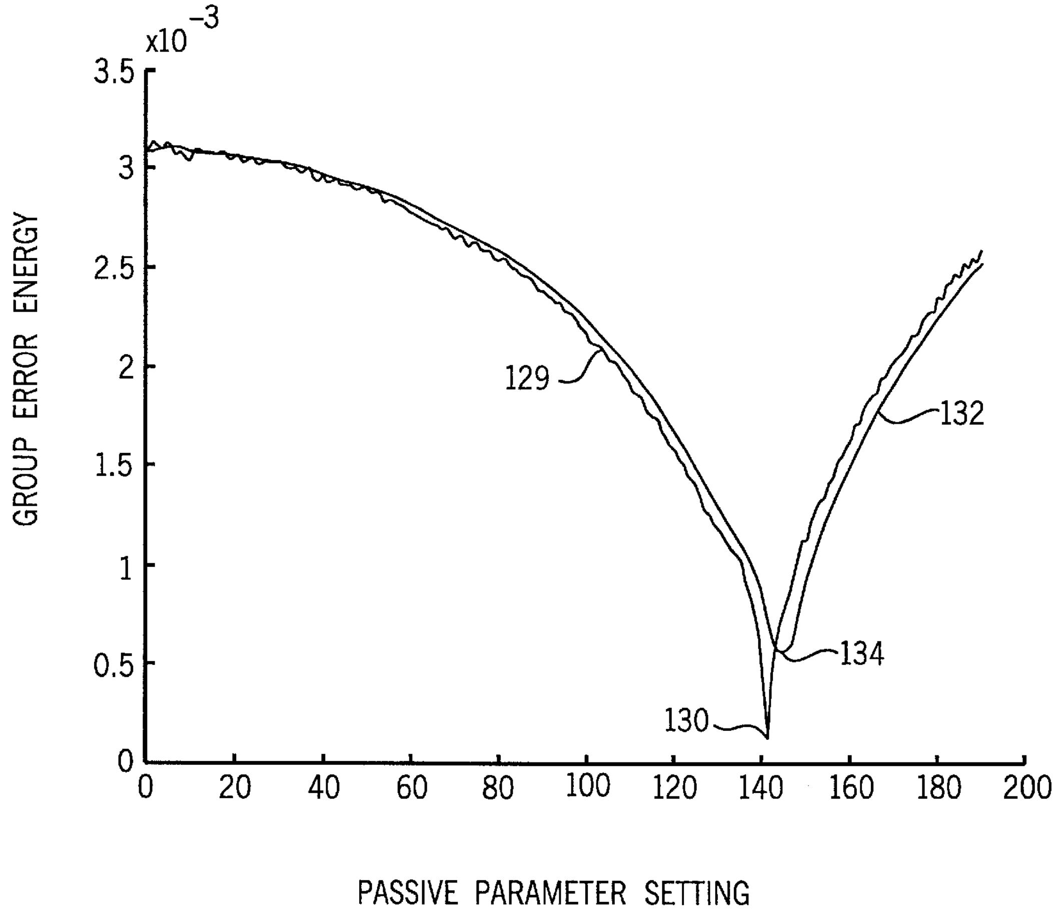
Figure 6C:
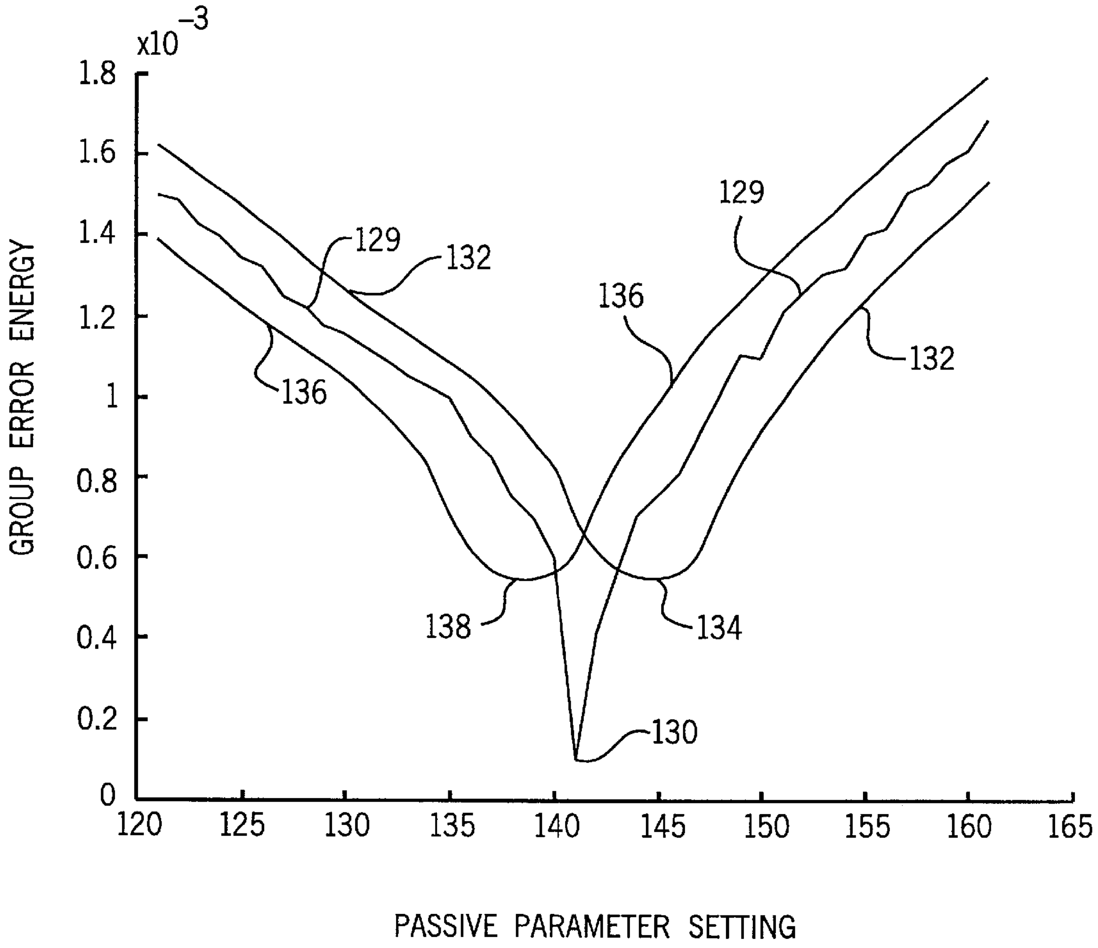

Referring now to FIGS. 6A, 6B and 6C, the preferred adaptation technique is a double scan technique that eliminates scan lag when determining an optimal passive parameter setting for a respective tuning element such as plunger 48 in resonator 46. It is known in the prior art to determine an optimum passive parameter setting for an adaptive passive tuning element by conducting a single scan of the full or partial range of possible passive parameter settings. This is accomplished by adjusting the position of the tuning element between the position corresponding to a scan start setting and a position corresponding to a scan end setting. However, such single scan techniques are not precise in some applications. FIG. 6A is a graph 129 illustrating actual error energy at the disturbance frequency $\omega_1$ as a function of the position of the tuning element between a fully closed position (parameter setting position=0) and a fully open position (parameter setting position=200). The optimal passive parameter setting for the tuning element is designated by reference numeral 130. FIG. 6B shows that the time averaged error energy for a single forward scan 132 from the closed position (parameter setting position=0) to an open position (parameter setting position=200) lags the actual error energy as indicated by curve 129. Thus, a minimum point 134 of the curve 132 representing the forward scan provides an incorrect estimate of the optimal passive parameter setting. While time averaging the error signals, block 114 in FIG. 5, is desirable to reduce the effects of random background noise at or near the frequency A of interest, such time averaging creates the time lag illustrated in FIG. 6B which adversely affects the selection of the optimal passive parameter setting for the tuning element. In the quarter wavelength resonator 46 shown in FIGS. 2 and 3, a full scan is about 8 inches long, and the lag shown in FIG. 6B is about ⅛ to ¼ of an inch. The effect of the time lag can be reduced by slow scanning, however, slow scanning greatly increases adaptation time. Therefore, in accordance with the invention, it is preferred to use a double scan technique wherein the optimal passive parameter setting is determined by averaging the minimal error value 134 of a forward scan and a minimal error value 138 of reverse scan 136, FIG. 6C.

FIG. 6C illustrates the double scan technique in detail. FIG. 6C shows a forward scan 132 having a minimal error value at location 134 corresponding to a passive parameter setting of position equal to about 145. The forward scan 132 is accomplished by adjusting the position of the tuning element 48 between the scan start position and the scan end position. In carrying out the invention, it is preferred to accomplish a full parameter scan in which the scan start position corresponds to a fully closed position for the tuning element 48 and the scan end position corresponds to a fully closed position for the tuning element 48. FIG. 6C also shows a reverse scan 136 of the possible passive parameter settings for the adjustable tuner. The reverse scan 136 is attained by adjusting the position of the tuning element 48 between the position corresponding to the scan end setting (preferably the fully open position) and the position corresponding to the scan start setting (preferably the fully closed position). The minimal error value 138 for the reverse scan 136 is located at a passive parameter setting position approximately equal to about 138. The average of the minimal error value 134 for the forward scan 132 and the minimal error value 138 for the reverse scan 136 is approximately equal to a passive parameter setting 141.5, see reference numeral 140. The average passive parameter setting 141.5, reference number 140, is only slightly more than the minimal value 130 for the actual error given by curve 129.

Figure 7A:
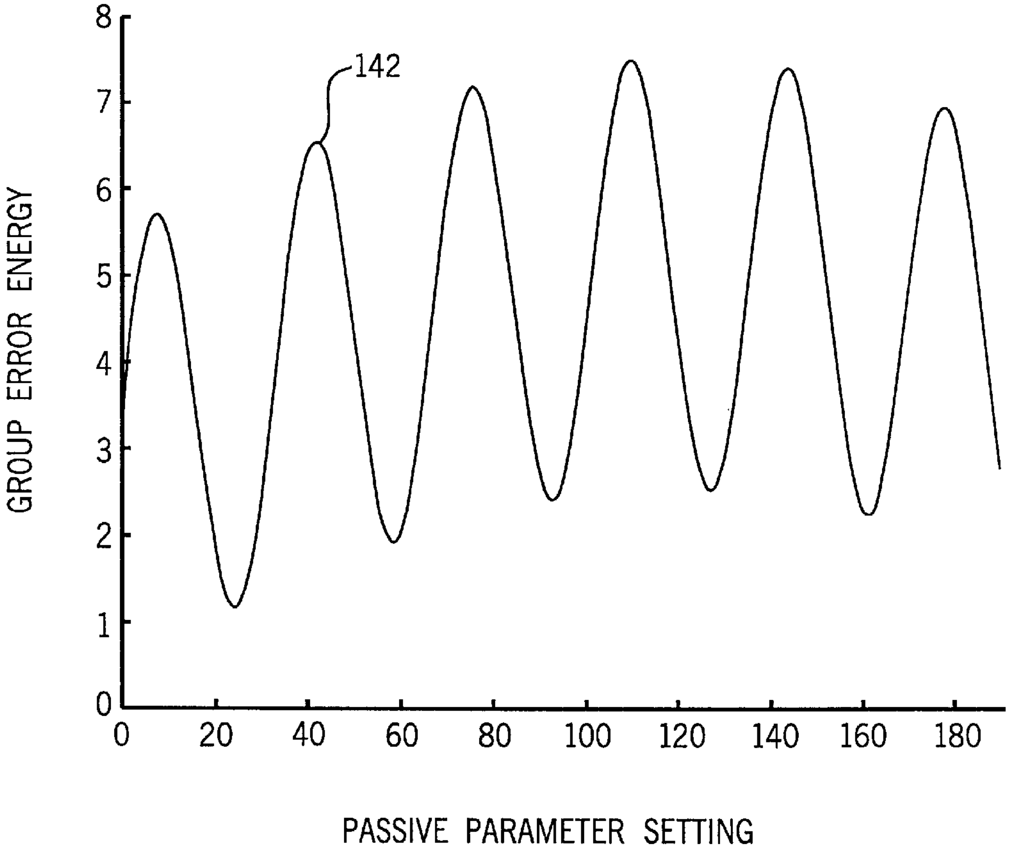
FIGS. 7A–7B are plots illustrating the effects of a time-varying disturbance source on adaptation.
Figure 7B:
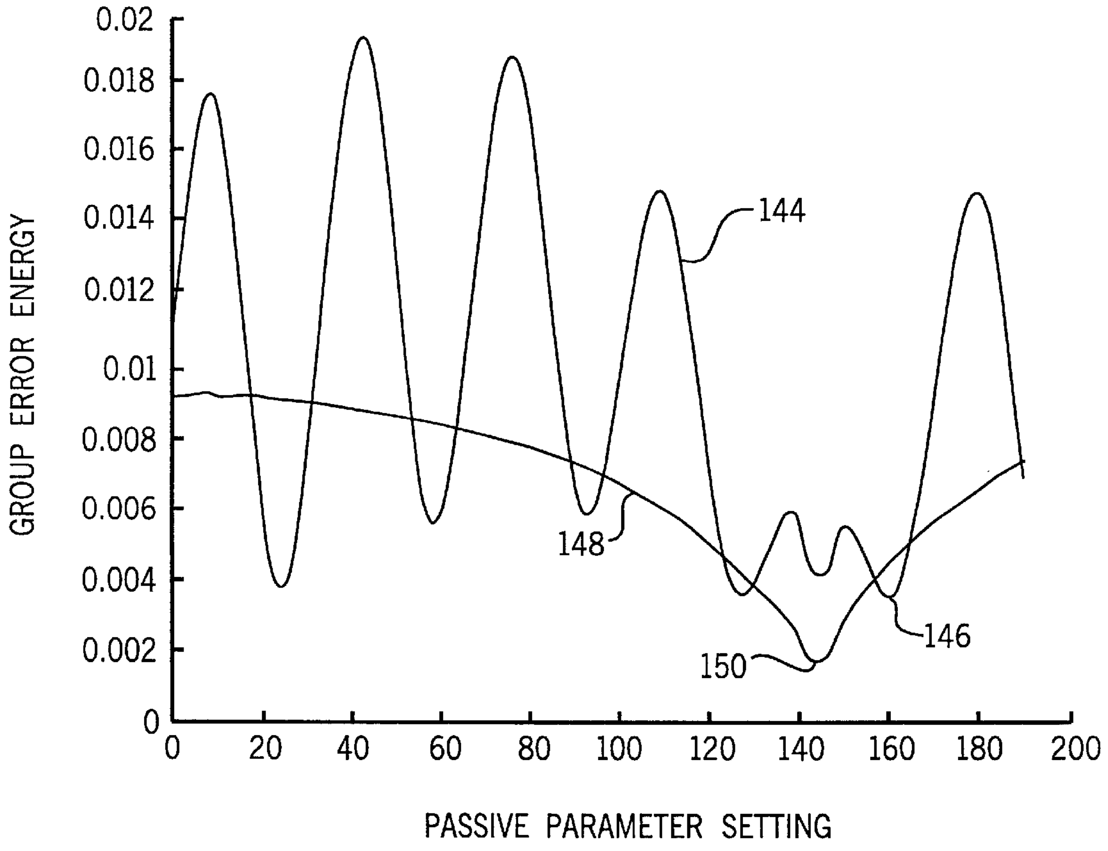

In addition to random background noise and scanning time lags, system adaptation can be skewed when the disturbance 16 from the disturbance source 14 varies with respect to time. Referring to FIGS. 7A–7B, FIG. 7A is a plot showing a time-varying group error energy level 142 as a function of passive parameter settings during an adaptation scan. The group energy level fluctuates greatly with respect to time during the adaptation scan. FIG. 7B plots a group error energy estimate 144 for an adaptation scan having a time-varying disturbance source 14. The curve reference number 144 has a minimal error value designated by reference number 146 corresponding approximately to passive parameter setting 160. FIG. 7B also plots a group error energy estimate 148 for an adaptation scan having constant disturbance levels 16. The curve 148 has a minimal error value designated by reference number 150 corresponding approximately to a passive parameter setting 141. FIG. 7B thus illustrates that a time-varying disturbance source 14 can result in significant inaccuracies in estimating the optimal setting for the tuning element (i.e. point 146 versus point 150).

Figure 8:
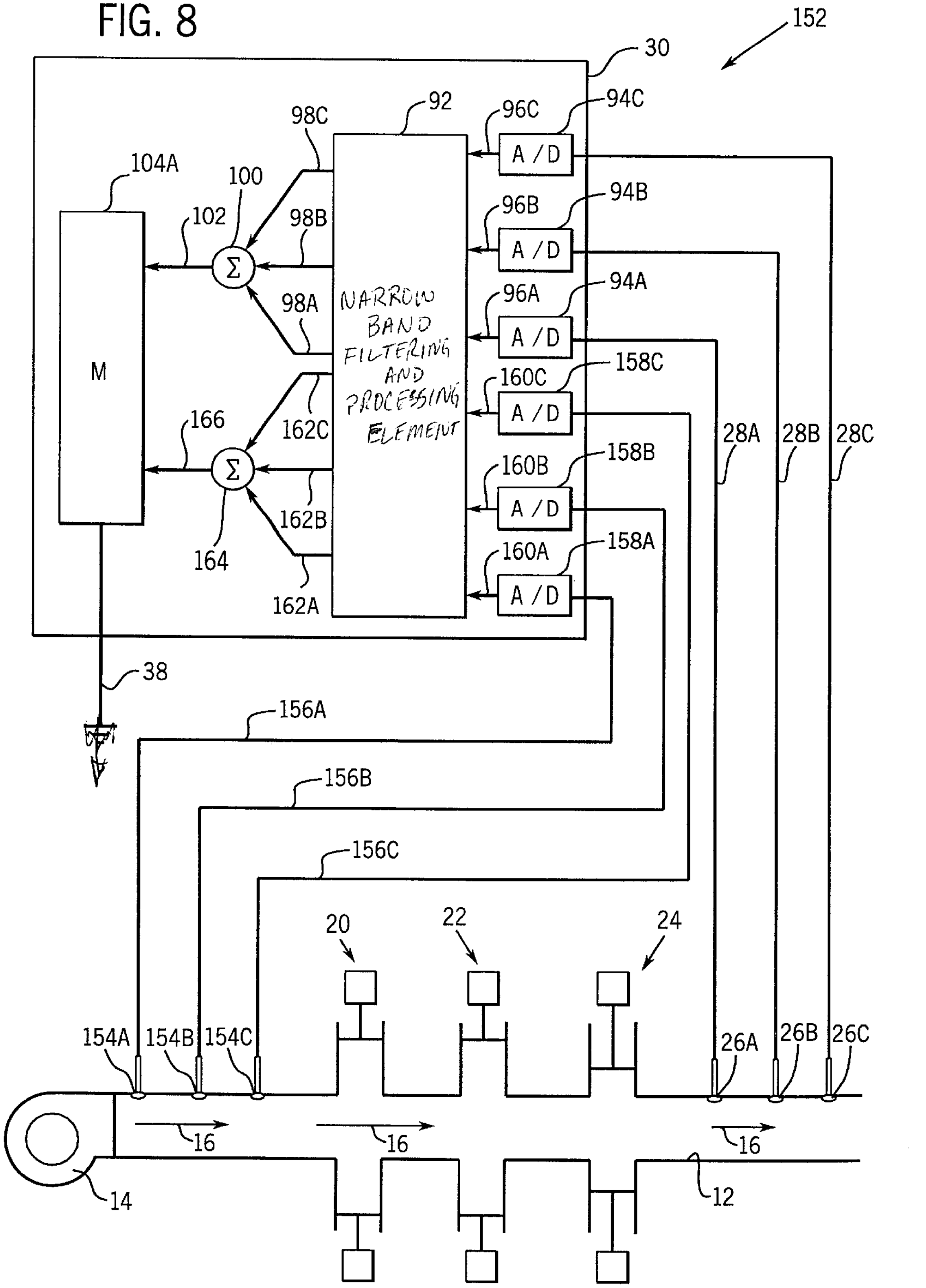
FIG. 8 is a schematic drawing illustrating the use of input sensors to account for the effects of a time-varying disturbance source on adaptation.

FIG. 8 shows a system 152 in which the control model 104A accounts for a time-varying disturbance source 14 during adaptation to overcome the problems with adaptation described with respect to FIGS. 7A and 7B. In many respects, the system 152 shown in FIG. 8 is similar to the system 10 described in detail in FIGS. 1–5, and like reference numbers are used where appropriate to facilitate understanding. The system 152 in FIG. 8 includes a plurality of input sensors 154A, 154B and 154C. The input sensors 154A, 154B, 154C sense the acoustic disturbance 16 in the duct 12 near the disturbance source 14. In a sound attenuation system, the input sensors 154A, 154B, 154C are preferably microphones, however, other types of sensors can be used to monitor the disturbance source 14. The input sensors 154A, 154B, 154C each generate an input characteristic signal that is transmitted to the electronic controller 30 via lines 156A, 156B, and 156C, respectively. The input characteristic signals in lines 156A, 156B, and 156C are analog signals that are converted to digital signals by A/D converters 158A, 158B, and 158C. The A/D converters 158A, 158B, and 158C output digital input characteristic signals in lines 160A, 160B and 160C that are transmitted to the narrow band filtering and processing element 92. The digital input characteristic signals are filtered and processed by the narrow band filtering and processing element 92 in the same manner as the digital error signals in lines 96A, 96B, 96C which has previously been described. The narrow band filtering and processing element 92 outputs processed input characteristic signals in lines 162A, 162B, and 162C, respectively. The separate processed input characteristic signals in lines 162A, 162B, 162C are summed together as illustrated by summer 164 to form a group processed input characteristic signal as illustrated by line 166. An example of a typical group processed input characteristic signal at line 166 in FIG. 8 is illustrated as curve 142 in FIG. 7A. The control model 104A accounts for a time-varying disturbance source 14 by using the group processed input characteristic signal in line 166 to adjust the value of the group processed error signal in line 102. In particular, the group processed error signal 102 given by curve 144 in FIG. 7B is divided by the group processed input characteristic signal 166 given by curve 142 in FIG. 7A of each passive parameter setting to generate an estimate of the group processed error signal for the scan at constant disturbance levels such as curve 148 in FIG. 7B.

Although the embodiment of the invention described is directed to attenuation of a tonal disturbance (or a narrow band disturbance) at a single frequency in the acoustic plant, the invention can be used to attenuate two or more distinct tones (or multiple narrow band disturbances) in the disturbance 16. When this is desired, one or more sets of multiple banks of adjustable tuners should be defined or added to the system for each additional frequency. However, it would normally not be necessary to provide additional input sensors 154A, 154B, 154C, or additional error sensors 26A, 26B, 26C. Rather, the control model 104, 104A in the electronic controller 30 can adapt the various sets of multiple banks of adjustable tuners using group processed error signals 102 and group processed input characteristic signals 166 that are filtered for the various frequencies of interest. As mentioned above, when the narrow band filtering and processing element 92A uses a heterodyning process, the same fixed narrow bandwidth filter can be used to filter all of the frequency-shifted input characteristic signals and error signals for each of the frequencies of interest.

While the preferred embodiments of the invention have been described with respect to an adaptive passive sound attenuation system implemented on a duct 12 in a sound attenuation application, the invention is not limited to such applications. For instance, many aspects of the invention are useful in sound attenuation applications where the acoustic plant 12 is not a duct. Similarly, the invention may be applied to systems where the disturbance source is not a fan. For instance, the invention may be useful for engine exhaust mufflers. Furthermore, many aspects of the invention are useful in passive vibration attenuation systems. In such passive vibration attenuation systems, the acoustic plant may be a beam or some other mechanical structure, the adjustable tuners 20A, 20B, 22A, 22B, 24A, 24B, may be tunable vibration absorbers, and the error sensors 26A, 26B, 26C and the input characteristic sensors 154A, 154B, 154C are preferably accelerometers. In other respects, such as frequency filtering and scanning techniques, an adaptive passive vibration system in accordance with the invention operates in the same manner as the adaptive passive sound attenuation systems illustrated specifically in the drawings. It may also be desirable to carry out the invention in a combined sound and vibration attenuation system.

Moreover, an adaptive passive system in accordance with the invention may be used in conjunction with either a conventional passive system, or a fully active system, or both.

Other modifications, alternatives and equivalents to the invention may be apparent to those skilled in the art. The following claims should be interpreted to include such modifications, alternatives and equivalents.

What is claimed is:

1. An adaptive passive acoustic attenuation system that attenuates an acoustic disturbance in an acoustic plant comprising:

multiple banks of adjustable tuners communicating acoustically with the acoustic plant, each adjustable tuner having passive acoustical characteristics determined in accordance with passive parameter settings;

an error sensor that senses an acoustic disturbance in the acoustic plant and generates an error signal in response thereto;

an electronic controller that receives the error signal from the error sensor and outputs correction signals to selectively adjust the passive parameter settings of the adjustable tuners;

means for adapting the system which comprises contemporaneously adjusting the passive parameter settings for all of the tuners in one of the banks to vary the acoustic disturbance sensed by the error sensor while the tuners in the other banks remain stationary;

means for determining whether each adjustable tuner is fully operational; and means for deactivating adjustment of any adjustable tuner in the system that is not fully operational.

2. An adaptive passive acoustic attenuation system that attenuates an acoustic disturbance in an acoustic plant comprising:

multiple banks of adjustable tuners communicating acoustically with the acoustic plant, each adjustable tuner having passive acoustical characteristics determined in accordance with passive parameter settings;

an error sensor that senses an acoustic disturbance in the acoustic plant and generates an error signal in response thereto;

an electronic controller that receives the error signal from the error sensor and outputs correction signals to selectively adjust the passive parameter settings of the adjustable tuners;

means for adapting the system which comprises contemporaneously adjusting the passive parameter settings for all of the tuners in one of the banks to vary the acoustic disturbance sensed by the error sensor while the tuners in the other banks remain stationary;

each adjustable tuner is a quarter wavelength resonator having a selectively positionable plunger and a stepper motor dedicated to each tuner that moves the respective plunger in response to the respective correction signal from the electronic controller;

the adjustable tuner comprises a first end stop switch that indicates when the plunger is at a fully closed position and a second end cap stop switch that indicates when the plunger is at a fully open position; and the electronic controller contains means for estimating the position of the plunger in the quarter wavelength resonator in accordance with the respective correction signals transmitted to the respective stepper motor.

3. A method of passively attenuating acoustic disturbances in an acoustic plant, the method comprising the steps of:

a) sensing an acoustic disturbance in an acoustic plant and generating an error signal in response thereto;

b) providing multiple banks of adjustable tuners that communicate acoustically with the acoustic plant;

c) determining an optimal setting for the adjustable tuners by contemporaneously adjusting all of the tuners in one of the banks to vary the acoustic disturbance in the acoustic plant while the tuners in the other banks remain stationary;

d) setting the adjustable tuners in the respective bank in unison so that the acoustic disturbance sensed in the acoustic plant is minimized; and e) repeating steps c) and d) for all of the tuners in each respective bank.

4. A method as recited in claim 3 further comprising the steps of repeating steps c) through e) listed in claim 3.

5. A method as recited in claim 3 further comprising the step of:

sensing the acoustic disturbance in the acoustic plant at several distinct physical locations to generate a plurality of error signals;

separately filtering each of the plurality of error signals to generate separate processed error signals representing the energy of the acoustic disturbance within a frequency bandwidth containing the disturbance of interest;

summing the plurality of separate processed error signals to generate a group processed error signal; and setting all of the adjustable tuners in each respective bank in unison so that the group processed error signal is minimized.

6. A method as recited in claim 5 wherein the acoustic plant has a plant inlet receiving acoustic input and the method further comprises:

sensing the acoustic disturbance with an input sensor at a location closer to the plant inlet than any of the adjustable tuners, and generating an input characteristic signal in response thereto; and using the input characteristic signal to adjust the determination of the optimal setting for the adjustable tuners.

7. A method as recited in claim 3 wherein the banks of adjustable tuners are defined by software within an electronic controller so that each adjustable tuner is assigned to a particular bank and the system is capable of reassigning adjustable tuners to other banks within the system.

8. A method as recited in claim 3 further comprising the steps of:

determining whether each adjustable tuner is fully operational on an intermittent basis; and deactivating adjustment of any adjustable tuner in the system that is not fully operational.

9. A method as recited in claim 3 wherein each adjustable tuner is a quarter wavelength resonator having a selectively positionable plunger and a stepper motor dedicated to each tuner that moves the respective plunger in response to a correction signal from an electronic controller, and wherein each adjustable tuner comprises a first end stop switch that indicates when the plunger is at a fully closed position and a second end stop switch that indicates when the plunger is at a fully open position; and the method further comprises the steps of:

estimating the position of the plunger in the quarter wavelength resonator in accordance with the respective correction signals transmitted from the stepper motor;

intermittently determining whether each adjustable tuner is fully operational by comparing the estimated position of the plunger in the quarter wavelength resonator as the plunger moves between a fully closed position and a fully open position or vice-versa; and deactivating adjustment of any adjustable tuner in the system that is not fully operational.

10. An adaptive passive acoustic attenuation system that attenuates an acoustic disturbance in an acoustic plant comprising:

an adjustable tuner communicating acoustically with the acoustic plant, the adjustable tuner having passive acoustic characteristics determined in accordance with passive parameter settings;

a group of error sensors, each error sensor sensing an acoustic disturbance in the acoustic plant and generating an error signal in response thereto; and an electronic controller that receives the error signals from the error sensors and outputs correction signals to selectively adjust the passive parameter settings of the adjustable tuner, the electronic controller having:

a narrow band filtering and processing element that receives the error signals from the error sensors and for each error signal outputs a processed error signal representing the magnitude of the acoustic disturbance within a frequency bandwidth containing the disturbance desired to be attenuated, and a summer that inputs the separate processed error signals and outputs a group processed error signal that is used when the electronic controller adapts the passive parameter settings for the adjustable tuner, wherein the narrow band filtering and processing element includes:

a frequency-shifting multiplier that receives the error signal from each error sensor and for each error signal outputs a frequency-shifted error signal; and a fixed narrow bandpass filter that inputs the frequency-shifted error signals.

11. An adaptive passive acoustic attenuation system as recited in claim 10 wherein the fixed narrow bandpass filter outputs a plurality of filtered disturbance signals and the narrow band filtering and processing element further includes a multiplier that multiplies each of the filtered disturbance signals by itself to output respective squared disturbance signals, and a time averager that inputs the squared disturbance signals and outputs the plurality of separate processed error signals.

12. An adaptive passive acoustic attenuation system as recited in claim 10 further comprising a broad bandpass filter that inputs the error signals from the error sensors and outputs a plurality of pre-filtered error signals to the frequency shifting multiplier.

13. A method of passively attenuating acoustic disturbances in an acoustic plant, the method comprising the steps of:

providing at least one adjustable tuner that communicates acoustically with an acoustic plant;

sensing a disturbance in the acoustic plant at a plurality of several distinct physical locations within the acoustic plant to generate a plurality of error signals;

frequency-shifting the error signals from the error sensor by multiplying each error signal by a heterodyning tone signal to generate a plurality of frequency-shifted error signals;

filtering the frequency-shifted error signals through a fixed narrow bandpass filter to generate a plurality of filtered disturbance signals;

estimating the energy of the plurality of filtered disturbance signals; and setting the adjustable tuner so that the sum of estimated energy is minimized.

14. The method as recited in claim 13 further comprising the step of:

pre-filtering the plurality of error signals through a broad bandpass filter before frequency-shifting the error signals from the error sensors.

15. A method as recited in claim 13 wherein the step of estimating the energy of the plurality of filtered disturbance signals is accomplished in accordance with the following expression:

$$\text{Emergy Est.}[k]=(\alpha)(\text{Energy Est.}[k-1])+(fds[k])(1-\alpha)$$

where (fds[k]) is the frequency-shifted filtered disturbance signal at time k, and $\alpha$ is a time averaging weighting constant $0 \leqq \alpha \leqq 1$, Energy Est. [k] is the energy estimate at time k and Energy Est. [k−1] is the energy estimate at time k−1.

16. A method as recited in claim 13 wherein the heterodyning tone signal is determined by tracking the frequency of the undesired disturbance in the acoustic plant and selecting the heterodyne tone signal so that the disturbance being attenuated is represented in the frequency-shifted filtered disturbance signals such that the disturbance lies within the frequency range of the fixed narrow bandpass filter.

17. A method as recited in claim 13 wherein the frequency of the disturbance within the acoustic plant is tracked by one of the error sensors.

18. A method as recited in claim 13 wherein the frequency of the disturbance within the acoustic plant is tracked by a tachometer monitoring a source of the disturbance.

19. A method as recited in claim 13 wherein the frequency of the disturbance within the acoustic plant is tracked by an input sensor located closer to a source of the disturbance than any of the adjustable tuners communicating acoustically with the acoustic plant.

20. A method of passively attenuating a first narrow band acoustic disturbance in an acoustic plant and a second distinct narrow band acoustic disturbance in the acoustic plant, the method comprising the steps of:

providing at least one first adjustable tuner communicating acoustically with the acoustic plant to attenuate the first narrow band disturbance;

providing at least one second adjustable tuner communicating acoustically with the acoustic plant to attenuate the second narrow band disturbance;

sensing disturbances in the acoustic plant at a plurality of several distinct physical locations within the acoustic plant to generate a plurality of error signals;

frequency-shifting the error signals from the error sensors by multiplying each error signal by a first heterodyning tone signal to generate a plurality of first frequency-shifted error signals;

filtering the first frequency-shifted error signals through a fixed narrow bandpass filter to generate a plurality of first filtered disturbance signals;

estimating the energy of the plurality of first filtered disturbance signals;

setting the at least one first adjustable tuner so that the sum of the estimated total energy represented by the first filtered disturbance signals is minimized;

frequency-shifting the error signals from the error sensors by multiplying each error signal by a second heterodyning tone signal to generate a plurality of second frequency-shifted error signals;

filtering the second frequency-shifted error signals through the fixed narrow bandpass filter to generate a plurality of second filtered disturbance signals;

estimating the energy of the second plurality of filtered disturbance signals; and setting the at least one second adjustable tuner so that the sum of the estimated total energy represented by the second filtered disturbance signals is minimized.

21. A method as recited in claim 20 wherein the at least one first adjustable tuner is one of a first plurality of adjustable tuners and the at least one second adjustable tuner is one of a second plurality of adjustable tuners, and the first plurality of adjustable tuners consists of a set of multiple banks of adjustable tuners and the second plurality of adjustable tuners consists of a second set of multiple banks of adjustable tuners, each adjustable tuner having passive acoustical characteristics determined in accordance with passive parameter settings; and wherein adapting the system comprises contemporaneously adjusting the passive parameter settings for all of the tuners in one of the banks to vary the acoustic disturbance sensed by the error sensors while the tuners in the other banks remain stationary.

22. A method of passively attenuating a plurality of narrow band acoustic disturbances in an acoustic plant, the method comprising the steps of:

providing a plurality of adjustable tuners communicating acoustically with the acoustic plant to attenuate a plurality of narrow band acoustic disturbances;

sensing disturbances in the acoustic plant at a plurality of several distinct physical locations within the acoustic plant to generate a plurality of error signals;

frequency-shifting the error signals from the error sensors by multiplying each eerror signal by a respective heterodyning tone signal to generate a plurality of corresponding frequency-shifted error signals;

filtering each of the corresponding frequency-shifted error signals through a fixed narrow bandpass filter to generate a plurality of corresponding filtered disturbance signals;

estimating the energy of the plurality of corresponding filtered disturbance signals for each respective narrow band acoustic disturbance;

assigning at least one adjustable tuner to attenuate each respective narrow band acoustic disturbance; and setting each respective adjustable tuner so that the sum of the estimated total energy represented by the filtered disturbance signals corresponding to the respective narrow band acoustic disturbance is minimized.

* * * * *

UNITED STATES PATENT AND TRADEMARK OFFICE

CERTIFICATE OF CORRECTION

PATENT NO. : 6,295,363 B1
DATED : September 25, 2001
INVENTOR(S) : Laak et al.

It is certified that error appears in the above-identified patent and that said Letters Patent is hereby corrected as shown below:

Title page,
Item [75], Inventors, delete "Trevor A. Laak, Jr." and substitute therefor -- Trevor A. Laak --, and delete "David W. Kapsos, Jr." and substitute therefor -- David W. Kapsos --

Column 17,
Line 18, delete "Emergy" and substitute therefor -- Energy --

Column 18,
Line 11, delete "eerror" and substitute therefor -- error --

Signed and Sealed this

Twenty-eighth Day of May, 2002

*Attest:*

JAMES E. ROGAN

*Attesting Officer*

*Director of the United States Patent and Trademark Office*